Jan. 5, 1926. 1,568,746
F. LAWACZECK
METHOD OF PRODUCING BLADE FACES FOR WATER TURBINES,
PUMPS, AND OTHER CENTRIFUGAL MACHINES
Filed August 11, 1925   2 Sheets-Sheet 1

Inventor:
Franz Lawaczeck

Jan. 5, 1926. 1,568,746
F. LAWACZECK
METHOD OF PRODUCING BLADE FACES FOR WATER TURBINES,
PUMPS, AND OTHER CENTRIFUGAL MACHINES
Filed August 11, 1925    2 Sheets-Sheet 2
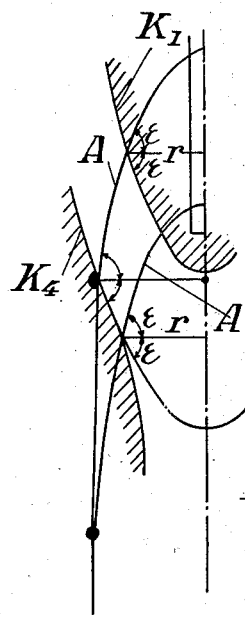
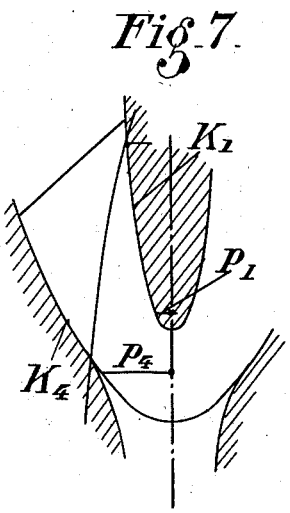
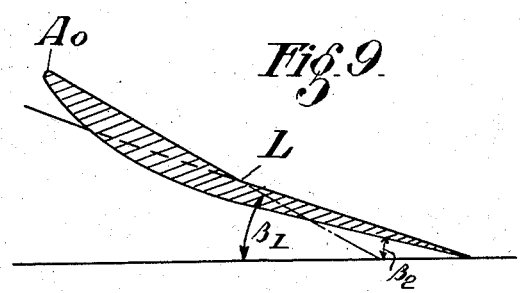
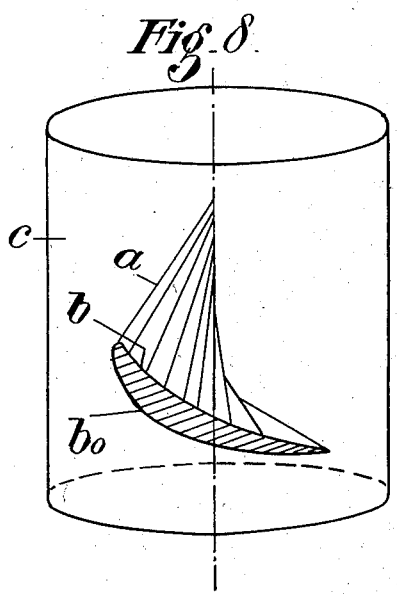
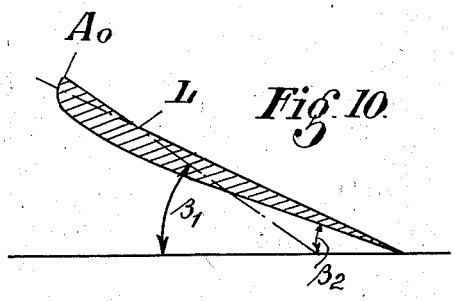
Inventor:
Franz Lawaczeck Patented Jan. 5, 1926.

1,568,746

UNITED STATES PATENT OFFICE.

FRANZ LAWACZECK, OF ENZIANHOF, POCKING, GERMANY.

METHOD OF PRODUCING BLADE FACES FOR WATER TURBINES, PUMPS, AND OTHER CENTRIFUGAL MACHINES.

Application filed August 11, 1925. Serial No. 49,640.

*To all whom it may concern:*

Be it known that I, FRANZ LAWACZECK, residing at Enzianhof, Pocking, Bavaria, Germany, German citizen, have invented new and useful Improvements in Methods of Producing Blade Faces for Water Turbines, Pumps, and Other Centrifugal Machines, of which the following is a specification.

My invention relates to a new method of producing helically shaped blade faces for water turbines, pumps and like centrifugal machines.

My invention is based on the perception that the requirements as stipulated in the theory of turbines for the shaping of the blades, can be wholly met by correctly choosing the generatrices and the pitch of the latter.

In the construction of turbines in most cases the rotor blades are made by making two matrices from a carefully shaped pattern block and then using said matrices as dies for stamping and shaping steel blanks. The latter are actually used as rotor-blades by placing them in a mould between loam-cores and joining them by means of cast steel which forms the boss and the rim of the rotor.

Owing to this cumbersome, time consuming and costly method it is generally impossible in designing water turbine plants to adapt the rotors to individual requirements to the desired extent.

One of the objects of my invention is to do away with the pattern block altogether and to make the casting for the rotor by templet moulding exclusively, or in cases, where a pattern block must still be used, to make the latter by a speedy, simple method which is after all in true conformity to the hydro-dynamic laws.

It has been proposed already to make helically shaped surfaces for blades of turbines, centrifugal pumps etc. by moving a straight line or a curve of concave or convex form along the periphery of a circle and at the same time uniformly i. e. steadily along the axis which is perpendicular to the plane of said circle.

Helical surfaces of this kind however are of no use in practice for conveying kinetic energy from the liquid to the blade and reversely, for the reason that the exchange of energy is solely dependent on the deviation to which the flow is subjected by the blades. With a helical surface of uniform pitch on one and the same cylinder the angles of admission and of discharge are equal. Consequently no deviation can occur between the points of admission and discharge.

According to this invention the pitch of the guide curves for the generatrix of the blade surfaces are made different from each other as to their pitch to an extent such as to effect the desired deviation of the flow at the respective parts of the blades.

Another object of my invention is to obtain the advantages, characteristic to the production of helical surfaces of uniform pitch, in the production of helical surfaces of non-uniform pitch viz of that kind which are adapted to exchange kinetic energy; to this end I propose to move the generatrix on two co-axial cylinders in curves the pitch of which vary with their advancement so as to provide for the exchange of energy.

My invention is diagrammatically illustrated by way of examples in the accompanying drawings which show several modifications of the novel method of making blade surfaces and also of the blade proper.

Figures 5, 6 and 7 illustrate the application of the method under consideration to turbines or centrifugal pumps with casings of special type.

Figures 8, 9 and 10 illustrate the application of the new method to the production of blades the cross-section of which is formed conformably to that of lifting planes of flying machines.

Figure 1:
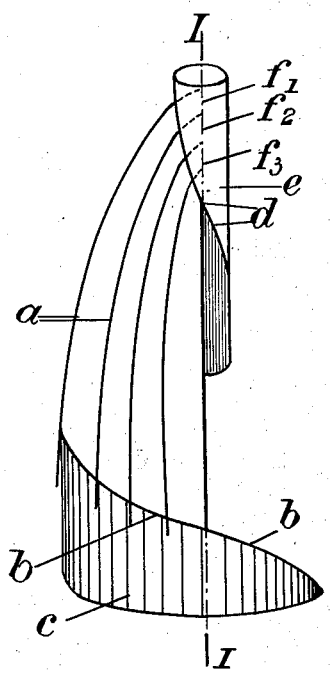
Figure 1 illustrates a method where guide curves are used in connection with two cylinders.

In the diagram shown in Figure 1 the generatrix $a$ of the blade surface is moved along the curve $b$ the latter being located on the larger cylinder $c$ which co-axially surrounds the axis of revolution I—I; generatrix $a$ is simultaneously moved along the curve $d$, seen on the smaller co-axial cylinder $e$.

According to my invention with the modification of the method under consideration the guide curves $b$ and $d$ in this instance do not show a uniform pitch but are given different, that is changing pitches at different points; consequently the points of the curve which are equidistant from each other as far as the angle of rotation is concerned are not equidistant as to the axial direction.

Consequently the length of the lines $f^1$, $f^2$, $f^3$ described by the generatrix $a$ on the axis I—I will differ from each other. The curvature of the generatrix $a$, e. g. a curve resembling a parabola, can thus be retained notwithstanding its changeable form, if only its parameter is changed accordingly.

Figure 2:
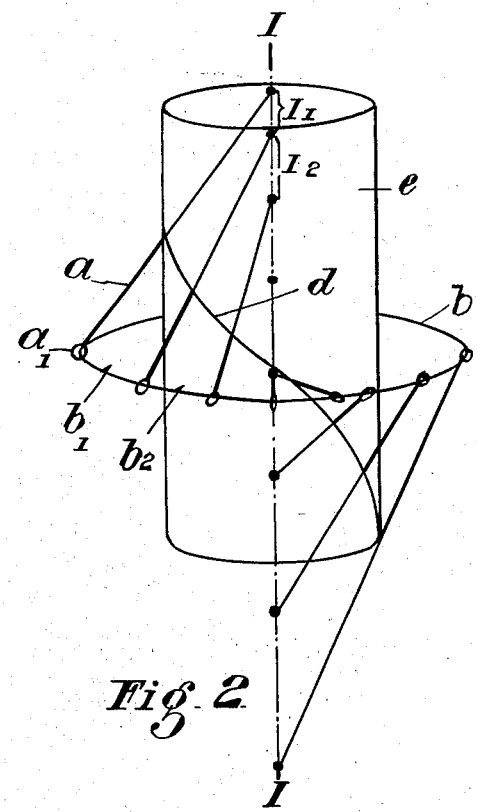
Figure 2 shows another method where a guide curve in the form of a circle is used and with a second guide member located on the axis.
Figure 4:
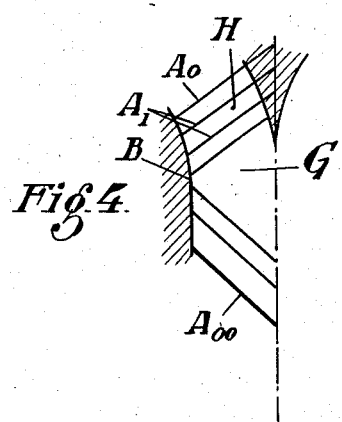
Figure 4 shows an improved type of blades.

If the pitch on one of the cylinders, e. g. the outer one $c$, is zero whereby the guideline $b$ on said cylinder becomes a circle, while the pitch of the other guide-curve is marked not on the cylinder $e$ but on the axis I—I proper, the surface of the blade can be easily designed in the following way, especially in case of a straight line having been chosen as generatrix:

A ruler having an eye $a^1$ is moved along a circular steel wire $b$, in such manner that the angular sections $b^1$, $b^2$, of equal length, on which the eye proceeds, correspond to the unequal linear sections $I^1$, $I^2$ etc. on the axis I—I along which the other end of the ruler is moved (see Fig. 2). By this method the inner guide cylinder can be dispensed with.

Figure 3:
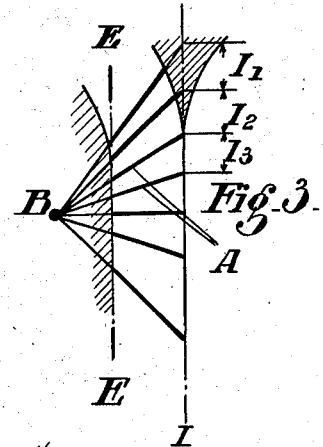
Figure 3 shows a blade proper in an elevation the latter being made in the manner customary in the designing of turbines.

In illustrating the procedure, indicated in Figure 2, in the manner customary with designers of turbine plants, Figure 3 is obtained. Owing to all the cross sections of the blades being swung about the axis I—I into one single plane of projection—which is identical with the plane of the drawing—the circle $b$ of Figure 2 appears as a point B, while the generatrices and the guiding cylinders are represented by rays A radiating from the said point B and by the line E—E respectively. The sections $I_1$, $I_2$, $I_3$ on the axis indicate the pitch. Thus the blade surface of Figure 2 can be defined with respect to the customary manner of illustrating turbine problems referred to, as being obtained by a non-uniform swinging of the generatrix about point B.

With this way of shaping, if the start and finish of the blade is defined by a generatrix representing the inlet and outlet edges it can be observed that the pitch is the greater the nearer the respective parts of the blade are to the axis. This however may be undesirable.

In order to obtain uniform conditions along the inlet edge as to the pitch, the helical face G, obtained by swinging the generatrix about point B can be extended through a helical face H the generatrix $A_1$ of which remaining parallel to itself up to the inlet edge while its pitch is optional. The same can be done with the outlet edge A.

The conditions are especially simple and can be well surveyed by choosing the generatrices as reflected images of the stream lines, wherein the axis or plane of reflection is represented by the radius or the radial plane of each point of intersection of the generatrix and the stream line.

Figure 5:
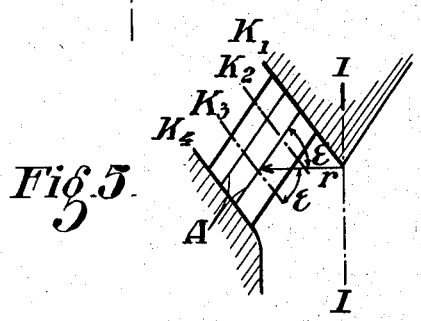

Figure 5 illustrates diagrammatically the simple case where stream lines $K_1$, $K_2$ for the rotor are chosen which are parallel to each other. In this case also the generatrices A are straight lines which everywhere form the same angle $\epsilon$ with the radius $r$ as the stream lines K.

Figure 6 shows diagrammatically the configuration of the boss $K_1$, and the outer configuration $K_4$ of the cross sectional area of the rotor as parabolas. Conformably thereto the generatrices A are parabolas reversed in that way that everywhere the angles $\epsilon$, between both curves or their tangents and the respective radius $r$ are equal to each other. In this case also all the stream lines located between both limitations are parabolas of congruent or identical shape.

It is advantageous to accelerate the water column on its way to the outlet of the rotor. This is obtained by giving the parabola $K_4$ of the outer rim of the rotor a larger parameter $p_4$ than that of the parabola $K_1$, which serves for the configuration of the boss (see Figure 7). The generatrices obtained by said stream lines are non-congruent parabolas.

In the case of high speed turbines it is advisable to shape the cross section of the blades conformably to the lifting planes of aeroplanes.

As seen in Figure 8 this is done by using the profile line $b_0$ as guide line on the cylinder $c$ in connection with and underneath the above mentioned guide line $b$ and by moving the generatrices $a$ above the guide line $b$ and the profile line $b_0$. The blade having been bodily circumscribed thereby is at every point in true conformity to the laws pertinent to the correct helically shaping of the blades and also to the laws pertinent to the correct profile of the latter. An effective method of increasing the swallowing capacity of the turbine consists in limiting a profile blade at the driving side by a guide line represented by two intersecting straight lines or curves tangent to said lines, while the front face is arched after the profile of the lifting planes of aeroplanes as described above with reference to Figure 8.

Figures 9 and 10 show two embodiments of this modification, wherein the blade is so bent or broken that the inlet angle $\beta_1$ has a larger pitch than the outlet angle $\beta_2$. With the modification shown in Figure 10 the angle point L, which may conveniently be replaced by a curve, is nearer to the inlet edge than in Figure 9.

What I claim is:

1. Method of producing blade faces for water turbines, pumps and other centrifugal machines which comprises arranging a helical like guide-element changing in its pitch on each of two co-axial cylinders, and moving a member representing the generatrix of the blade faces along said guide elements.

2. Method for the purpose set forth in claim 1, which comprises arranging a circular guide element, (pitch equal to zero), on one of two co-axial cylinders arranging a helical guide element changing in its pitch on the barrel or axis of the other cylinder and moving the member representing the generatrix of the blade faces along said guide elements.

3. Method for the purpose set forth in claim 1, which comprises arranging a helical like guide element changing in its pitch on the barrels of each of two co-axial cylinders, and moving a member representing the generatrix of the blade faces along said guide elements, the configuration and form of the generatrix being changed in the course of its movement while it functional character is retained.

4. Method for the purpose set forth in claim 1, which comprises arranging a helical like guide element changing in its pitch on the barrels of each of two co-axial cylinders, and moving a member representing the generatrix of the blade faces along said guide elements, the configuration and form of the generatrix being changed in the course of its movement while its functional character is retained, and arranging additional helical faces, being uniform in their pitch at the inlet and outlet edge of the helical blade faces which are non-uniform in their pitch.

5. Method for the purpose set forth in claim 1 which comprises arranging a helical like guide element changing in its pitch on the barrels of each of two co-axial cylinders, and moving a member representing the generatrix of the blade faces along said guide elements, the configuration and form of the generatrix being changed in the course of its movement while its functional character is retained, the form of the generatrices being the reverse images of the stream lines as reflected by the radius, so that the tangent of the generatrix at every point forms the same angle with the radius as the tangent of the stream line passing through the respective point.

6. Method for the purpose set forth in claim 1, which comprises arranging helical like guide elements changing in pitch on the barrels of each of two co-axial cylinders, and moving a parabolic member representing the generatrix of the blade faces along said guide elements.

7. Method for the purpose set forth in claim 1, which comprises arranging a helical like face the guide line of which being represented at the driving side by two intersecting straight lines and at the front side by a profile resembling that of the lifting planes of aeroplanes.

8. Method for the purpose set forth in claim 1, which comprises arranging a helical face the guide line of which being represented at the driving side by a curve tangent to two intersecting straight lines, and at the front side by a profile resembling that of the lifting planes of aeroplanes.

9. Method for the purpose set forth in claim 1, which comprises arranging a helical face the guide line of which being represented at the driving side by two intersecting straight lines and at the front side by a profile resembling that of the lifting planes of aeroplanes, the face at the driving side being bent so as to form a steeper inlet angle.

In testimony whereof I have signed my name to this specification.

FRANZ LAWACZECK.